US010469179B2

(12) United States Patent
Ota et al.

(10) Patent No.: US 10,469,179 B2
(45) Date of Patent: Nov. 5, 2019

(54) DISTORTION COMPENSATION APPARATUS AND DISTORTION COMPENSATION METHOD

(71) Applicant: FUJITSU LIMITED, Kawasaki-shi, Kanagawa (JP)

(72) Inventors: Tomoya Ota, Kawasaki (JP); Toshio Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 80 days.

(21) Appl. No.: 15/905,313

(22) Filed: Feb. 26, 2018

(65) Prior Publication Data

US 2018/0278343 A1   Sep. 27, 2018

(30) Foreign Application Priority Data

Mar. 24, 2017   (JP) ................................. 2017-060144

(51) Int. Cl.
*H04B 15/00*   (2006.01)

(52) U.S. Cl.
CPC ..................... *H04B 15/00* (2013.01)

(58) Field of Classification Search
CPC .................. H04B 15/00; H04B 1/0475; H04B 2001/0425
See application file for complete search history.

(56) References Cited

U.S. PATENT DOCUMENTS

| 8,938,027 | B2 | 1/2015 | Hirose et al. | |
| 8,948,325 | B1* | 2/2015 | Warner | H04B 1/0475 375/297 |
| 9,237,054 | B2* | 1/2016 | Kawasaki | H04L 27/367 |
| 9,735,815 | B1* | 8/2017 | Hirai | H04B 17/14 |
| 10,033,414 | B2* | 7/2018 | Ota | H04B 1/0475 |
| 2006/0001487 | A1* | 1/2006 | Petrovic | H03F 1/26 330/149 |
| 2012/0147991 | A1* | 6/2012 | Matsubara | H03F 1/3241 375/296 |

(Continued)

FOREIGN PATENT DOCUMENTS

| JP | 11-289227 A | 10/1999 |
| JP | 2002-084146 A | 3/2002 |

(Continued)

OTHER PUBLICATIONS

Bassam, S.A., et. al., "2-D Digital Predistortion (2-D-DPD) Architecture for Concurrent Dual-Band Transmitters." IEEE Transactions on Microwave Theory and Techniques, vol. 59, No. 10, pp. 2547-2553, Oct. 2011.

(Continued)

*Primary Examiner* — Lewis G West
(74) *Attorney, Agent, or Firm* — Arent Fox LLP

(57) ABSTRACT

A distortion compensation apparatus includes: a generation unit that generates a first signal to be used on a transmission side and a feedback side in common; a conversion unit that converts a frequency of a third signal that is to be an even-order distortion compensation signal by using a second signal that is based on the first signal; and a compensation unit that compensates an even-order distortion in a transmission signal caused by amplification by using a signal obtained by frequency conversion for the third signal by the conversion unit.

5 Claims, 7 Drawing Sheets

(56) References Cited

U.S. PATENT DOCUMENTS

| | | | | |
|---|---|---|---|---|
| 2014/0191799 | A1* | 7/2014 | Ohkawara | H04B 1/0475 330/149 |
| 2014/0274199 | A1* | 9/2014 | Yin | H04B 1/30 455/550.1 |
| 2014/0362949 | A1* | 12/2014 | Pratt | H04B 1/0475 375/296 |
| 2015/0304154 | A1* | 10/2015 | Utsunomiya | H04L 27/368 375/297 |
| 2017/0033813 | A1* | 2/2017 | Jiang | H04B 17/21 |
| 2017/0288708 | A1* | 10/2017 | Ota | H04B 1/0475 |
| 2017/0338841 | A1* | 11/2017 | Pratt | H04B 1/0475 |
| 2018/0175808 | A1* | 6/2018 | Ota | H03F 1/3247 |

FOREIGN PATENT DOCUMENTS

| | | |
|---|---|---|
| JP | 2003-188746 A | 7/2003 |
| JP | 2006-094043 A | 4/2006 |
| JP | 2012-227881 A | 11/2012 |
| JP | 2013-089993 A | 5/2013 |
| JP | 2014-003527 A | 1/2014 |
| WO | WO 2013/118367 A1 | 8/2013 |

OTHER PUBLICATIONS

Ota, T., et. al., "A Novel Adaptive Digital Predistortion for Concurrent Multi-Band RF Power Amplifiers," IEICE Technical Report, pp. 7-10, Apr. 2016.

Younes, M., et. al., "On the Modeling and Linearization of a Concurrent Dual-Band Transmittter Exhibiting Nonlinear Distortion and Hardware Impairments," IEEE Transactions on Circuits and Systems, vol. 60, No. 11, pp. 3055-3068, Nov. 2013.

\* cited by examiner

DISTORTION COMPENSATION APPARATUS AND DISTORTION COMPENSATION METHOD

CROSS-REFERENCE TO RELATED APPLICATION

This application is based upon and claims the benefit of priority of the prior Japanese Patent Application No. 2017-060144, filed on Mar. 24, 2017, the entire contents of which are incorporated herein by reference.

FIELD

The embodiments discussed herein are related to a distortion compensation apparatus and a distortion compensation method.

BACKGROUND

In the field of wireless mobile communication, there are proposed techniques of compensating a nonlinear distortion of a power amplifier used in a base station or the like. In a case of amplifying signals in a plurality of frequency bands concurrently by a common power amplifier, one of the techniques compensates a nonlinear distortion by using a plurality of distortion compensation units and a dual-band DPD (Digital Pre-Distortion). Further, there is a power amplifier using the dual-band DPD, which includes a dual-input truncated Volterra model digital filer in the preceding stage of a two-dimensional LUT (Look Up Table) and also compensates a second-order distortion. With regard to harmonics or intermodulation distortions generated in another band, there are a technique of performing distortion compensation by adding a signal with inverse characteristics and a technique of performing distortion compensation by solving nonlinear simultaneous equations.

However, the techniques described above are difficult to obtain sufficient distortion compensation performance, and may cause deterioration of radio quality. For example, in a case of amplifying signals in a plurality of frequency bands concurrently by a common power amplifier, even-order distortions may be generated at a frequency corresponding to a difference between center frequencies of two bands or at a frequency that is twice a lower one of the center frequencies under a condition where one of the center frequencies of the two bands is about twice the other center frequency (for example, 4.6 GHz and 9.0 GHz). Further, even in a case where signals in a plurality of frequency bands are amplified concurrently by a plurality of power amplifiers and are combined with each other, if isolation of a combiner is insufficient, even-order distortions may be generated similarly. When these even-order distortions are generated at a frequency close to a band of a transmission signal, it is difficult to cut the even-order distortions by a filter. Even if cutting by a filter is possible, a steep filter is needed, which increases the circuit scale of a device. In particular, in a case where even-order distortions are generated in a band of a transmission signal, cutting by a filter is very difficult.

Therefore, a distortion compensation apparatus has been proposed, which suppresses even-order distortions in addition to odd-order distortions generated in a case of amplifying a multi-band signal by a power amplifier. This apparatus includes both a distortion compensation unit that compensates odd-order distortions and a distortion compensation unit that compensates even-order distortions. This apparatus employs a configuration in which, when a dual-band signal in a band A (a center frequency $f_A$) and a band B (a center frequency $f_B$) is subjected to common amplification ($f_A < f_B$), even-order distortions generated at a center frequency of $2f_A$ and a center frequency of $f_B - f_A$ are compensated in addition to odd-order distortions generated in the bands A and B.

Next, problems of the related distortion compensation apparatus described above are explained with reference to FIG. 7. FIG. 7 is an explanatory diagram of the problems of the related distortion compensation apparatus. The distortion compensation apparatus uses a local oscillator source with a frequency of $f_{LO1}$ that is common to a transmission side and a feedback side for a band A (a center frequency $f_A$) and a local oscillator source with a frequency of $f_{LO2}$ that is common to a transmission side and a feedback side for a band B (a center frequency $f_B$). In general, a frequency shift ($\Delta f_1$, $\Delta f_2$) is momentarily generated in the local oscillator source because of a phase fluctuation. However, the frequency shift on the transmission side and that on the feedback side are canceled out. Therefore, the frequency shift exerts no influence. In a low-band side path on the transmission side, which is illustrated as an upper path, the distortion compensation apparatus outputs a band-A transmission signal with a frequency of $f_A - f_{LO1}$ from a DAC (Digital to Analog Converter), and converts the frequency of that transmission signal by an up converter with a local frequency of $f_{LO1} + \Delta f_1$ to a frequency of $f_A + \Delta f_1$. Similarly, in a high-band side path on the transmission side, which is illustrated as a lower path, the distortion compensation apparatus outputs a band-B transmission signal with a frequency of $f_B - f_{LO2}$ from a DAC, and converts the frequency of that transmission signal to a frequency of $f_B + \Delta f_2$ by an up converter with a local frequency of $f_{LO2} + \Delta f_2$. These radio frequency (RF) signals are combined with each other by a signal combiner. The resultant signal is subjected to power amplification by an amplifier.

On the feedback side, a feedback signal that is a portion of an amplifier output and is obtained by a coupler, is distributed into two signals by a distributor. In an upper path, that is, a low-band side path, the distortion compensation apparatus allows a feedback signal in the band A (a center frequency $f_A + \Delta f_1$) to pass through an LPF (Low Pass Filter) and converts the frequency of that feedback signal to a frequency of $f_A - f_{LO1}$ by a down converter with a local frequency of $f_{LO1} + \Delta f_1$. The converted signal is converted from an analog signal to a digital signal by an ADC (Analog to Digital Converter). In a lower path, that is, a high-band side path, the distortion compensation apparatus allows a feedback signal in the band B (a center frequency $f_B + \Delta f_2$) to pass through an HPF (High Pass Filter) and converts the frequency of that feedback signal to a frequency of $f_B - f_{LO2}$ by a down converter with a local frequency of $f_{LO2} + \Delta f_2$. The converted signal is converted from an analog signal to a digital signal by an ADC. In this manner, with respect to a main signal, the distortion compensation apparatus uses the local oscillator source with the frequency of $f_{LO1}$ that is common to the transmission side and the feedback side for the band A and the local oscillator source with the frequency of $f_{LO2}$ that is common to the transmission side and the feedback side for the band B. Therefore, the frequency of a DAC output and the frequency of an ADC input match each other perfectly, so that influence of a frequency shift caused by a phase fluctuation of the local oscillator source is eliminated.

However, even-order distortions generated at a center frequency of $2f_A$ and a center frequency of $f_B - f_A$ are affected by the above frequency shift. Frequencies of even-order distortion compensation signals are $2f_A+\Delta f_2$ and $f_B-f_A+\Delta f_1$, respectively. Meanwhile, in a case where the frequency of the band A is $f_A+\Delta f_1$ and the frequency of the band B is $f_B+\Delta f_2$, frequencies at which the even-order distortions are actually generated are $2f_A+2\Delta f_1$ and $f_B-f_A+\Delta f_2-\Delta f_1$, respectively. Therefore, a condition where the frequencies at which these even-order distortions are generated and the frequencies of the above even-order distortion compensation signals match each other is $2\Delta f_1=\Delta f_2$. However, in general, two independent local oscillator sources do not always satisfy the condition of $2\Delta f_1=\Delta f_2$. Therefore, shifting is generated between the frequency at which even-order distortions are actually generated and the frequency of the even-order distortion compensation signals, so that a phenomenon appears in which even-order residual distortions move up and down over time in a spectrum waveform of an output of a power amplifier after distortion compensation. Therefore, an effect of suppressing the even-order distortions is lowered because of the influence of the local phase fluctuation. Consequently, distortion compensation performance in common amplification of multiple bands is lowered.

SUMMARY

According to an aspect of the embodiment, a distortion compensation apparatus includes: a generation unit that generates a first signal to be used on a transmission side and a feedback side in common; a conversion unit that converts a frequency of a third signal that is to be an even-order distortion compensation signal by using a second signal that is based on the first signal; and a compensation unit that compensates an even-order distortion in a transmission signal caused by amplification by using a signal obtained by frequency conversion for the third signal by the conversion unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. The distortion compensation apparatus and the distortion compensation method disclosed in the present application are not limited to the embodiments.

Figure 1:
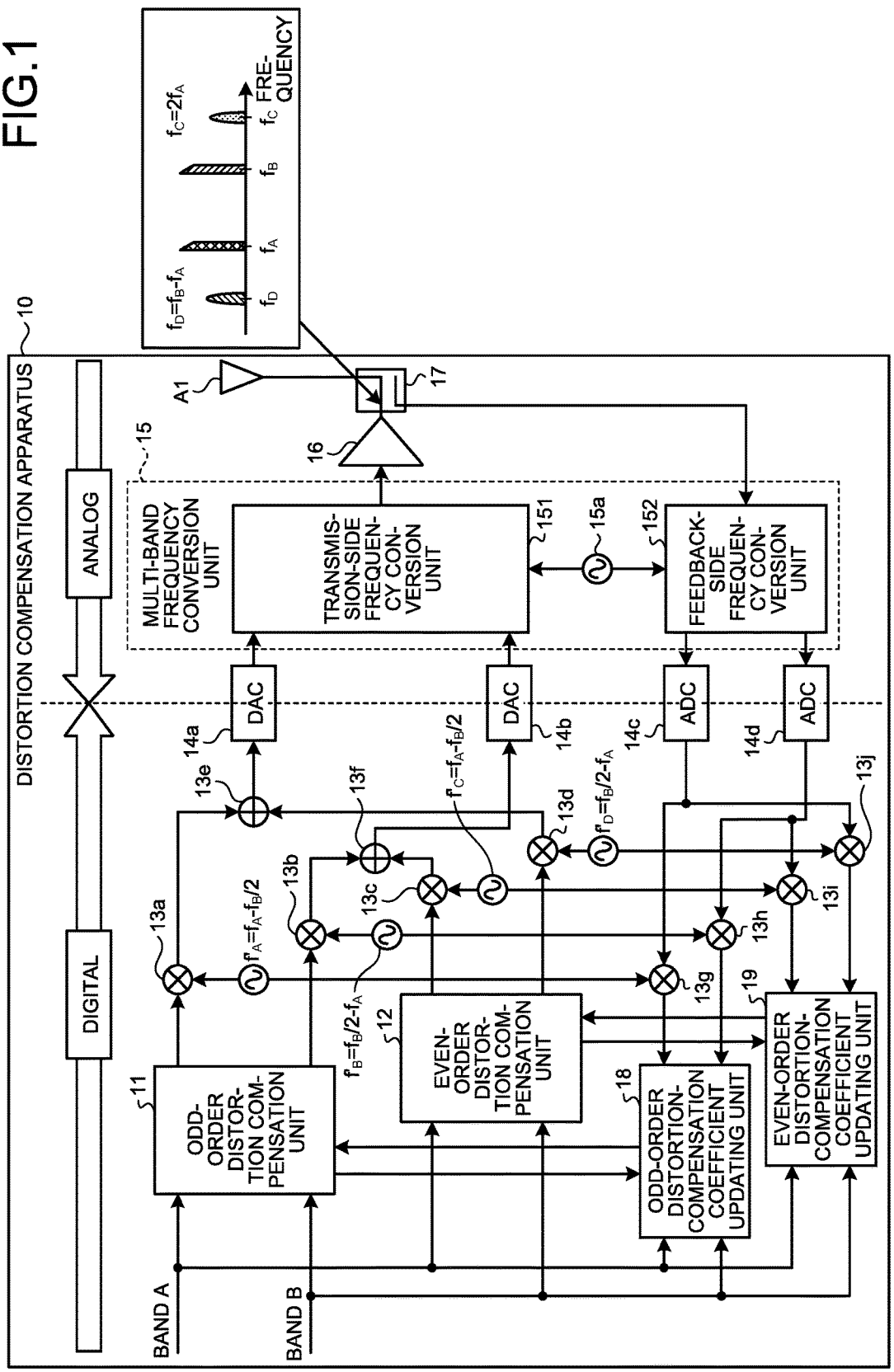
FIG. 1 is a diagram illustrating an overall configuration of a distortion compensation apparatus according to an embodiment of the present invention.

FIG. 1 is a diagram illustrating an overall configuration of a distortion compensation apparatus 10 according to an embodiment of the present invention. The distortion compensation apparatus 10 amplifies, by a common amplifier, a signal obtained by performing frequency conversion for a baseband signal (multi-band signal) in a plurality of frequency bands (for example, 4.6 GHz and 9.0 GHz) to have radio frequencies (RF). As illustrated in FIG. 1, the distortion compensation apparatus 10 includes an odd-order distortion compensation unit 11, an even-order distortion compensation unit 12, up converters 13a to 13d, signal combiners 13e and 13f, and down converters 13g to 13j. The distortion compensation apparatus 10 also includes common DACs (Digital to Analog Converter) 14a and 14b, common ADCs (Analog to Digital Converter) 14c and 14d, a multi-band frequency conversion unit 15, an amplifier 16, a coupler 17, an odd-order distortion-compensation coefficient updating unit 18, and an even-order distortion-compensation coefficient updating unit 19. These constituent elements are connected in one direction or both directions to allow input and output of various signals and data.

Further, the multi-band frequency conversion unit 15 includes a transmission-side frequency conversion unit 151, a feedback-side frequency conversion unit 152, and one local oscillator source 15a that is common to the frequency conversion units 151 and 152.

The odd-order distortion compensation unit 11 generates an odd-order distortion compensation signal for a band A (a center frequency $f_A$) and an odd-order distortion compensation signal for a band B (a center frequency $f_B$) based on two inputs, that is, a band-A transmission signal and a band-B transmission signal. The even-order distortion compensation unit 12 generates an even-order distortion compensation signal with a center frequency of $f_C=2f_A$ and an even-order distortion compensation signal with a center frequency of $f_D=f_B-f_A$ based on the two inputs, that is, the band-A transmission signal and the band-B transmission signal.

In a digital region, the up converter 13a performs frequency conversion for the odd-order distortion compensation signal for the band A (the center frequency $f_A$) to obtain a frequency of $f'_A=f_A-f_B/2$. The up converter 13d performs frequency conversion for the even-order distortion compensation signal with the center frequency of $f_D=f_B-f_A$ to obtain a frequency of $f'_D=f_B/2-f_A$. The signal combiner 13e combines digital signals after frequency conversion with each other. The common DAC 14a converts the digital signal after signal combination to an analog signal. The up converter 13b performs frequency conversion for the odd-order distortion compensation signal for the band B (the center frequency $f_B$) to obtain a frequency of $f'_B=f_B/2-f_A$. The up converter 13c performs frequency conversion for the even-order distortion compensation signal with the center frequency of $f_C=2f_A$ to obtain a frequency of $f'_C=f_A-f_B/2$. The signal combiner 13f combines the digital signals after frequency conversion with each other. The common DAC 14b converts the digital signal after signal combination to an analog signal. Distortion compensation signals after analog conversion are up-converted by the transmission-side frequency conversion unit 151 to have an RF and are then subjected to power amplification by the amplifier 16.

Next, a feedback signal is described. A signal that is a portion of an output of the amplifier 16 obtained by the coupler 17 is down-converted by the feedback-side frequency conversion unit 152 from RF to a baseband and is then distributed and output as two signals. The feedback-side frequency conversion unit 152 outputs a low-band side feedback signal, that is, a feedback signal including an odd-order distortion in the band A (the center frequency $f_A$) and an even-order distortion with the center frequency of $f_D=f_B-f_A$ as one output. The feedback-side frequency conversion unit 152 outputs a high-band side feedback signal, that is, a feedback signal including an odd-order distortion in the band B (the center frequency $f_B$) and an even-order distortion with the center frequency of $f_C=2f_A$ as the other output.

The common ADCs 14c and 14d convert the two feedback signals described above from an analog signal to a digital signal, respectively. An upper ADC output signal is distributed by a digital signal distributor, and a signal obtained by frequency converting the feedback signal for the band A (the center frequency $f_A$) from the frequency of $f'_A=f_A-f_B/2$ to the baseband is input to the odd-order distortion-compensation coefficient updating unit 18. Also, a signal obtained by frequency converting the feedback signal of the even-order distortion with the center frequency of $f_D=f_B-f_A$ from the frequency of $f'_D=f_B/2-f_A$ to the baseband is input to the even-order distortion-compensation coefficient updating unit 19. A lower ADC output signal is distributed by a digital signal distributor, and a signal obtained by frequency converting the feedback signal for the band B (the center frequency $f_B$) from the frequency of $f'_B=f_B/2-f_A$ to the baseband is input to the odd-order distortion-compensation coefficient updating unit 18. Also, a signal obtained by frequency converting the feedback signal of the even-order distortion with the center frequency of $f_C=2f_A$ from the frequency of $f'_C=f_A-f_B/2$ to the baseband is input to the even-order distortion-compensation coefficient updating unit 19.

The odd-order distortion-compensation coefficient updating unit 18 updates an odd-order distortion-compensation coefficient based on the band-A transmission signal, the band-B transmission signal, the feedback signal for the band A (the center frequency $f_A$), the feedback signal for the band B (the center frequency $f_B$), and a distortion-compensation coefficient before being updated, and outputs the updated odd-order distortion-compensation coefficient to the odd-order distortion compensation unit 11. Similarly, the even-order distortion-compensation coefficient updating unit 19 updates an even-order distortion-compensation coefficient based on the band-A transmission signal, the band-B transmission signal, the feedback signal with the center frequency of $f_C=2f_A$, the feedback signal with the center frequency of $f_D=f_B-f_A$, and a distortion-compensation coefficient before being updated, and outputs the updated even-order distortion-compensation coefficient to the even-order distortion compensation unit 12.

First Embodiment

Figure 2:
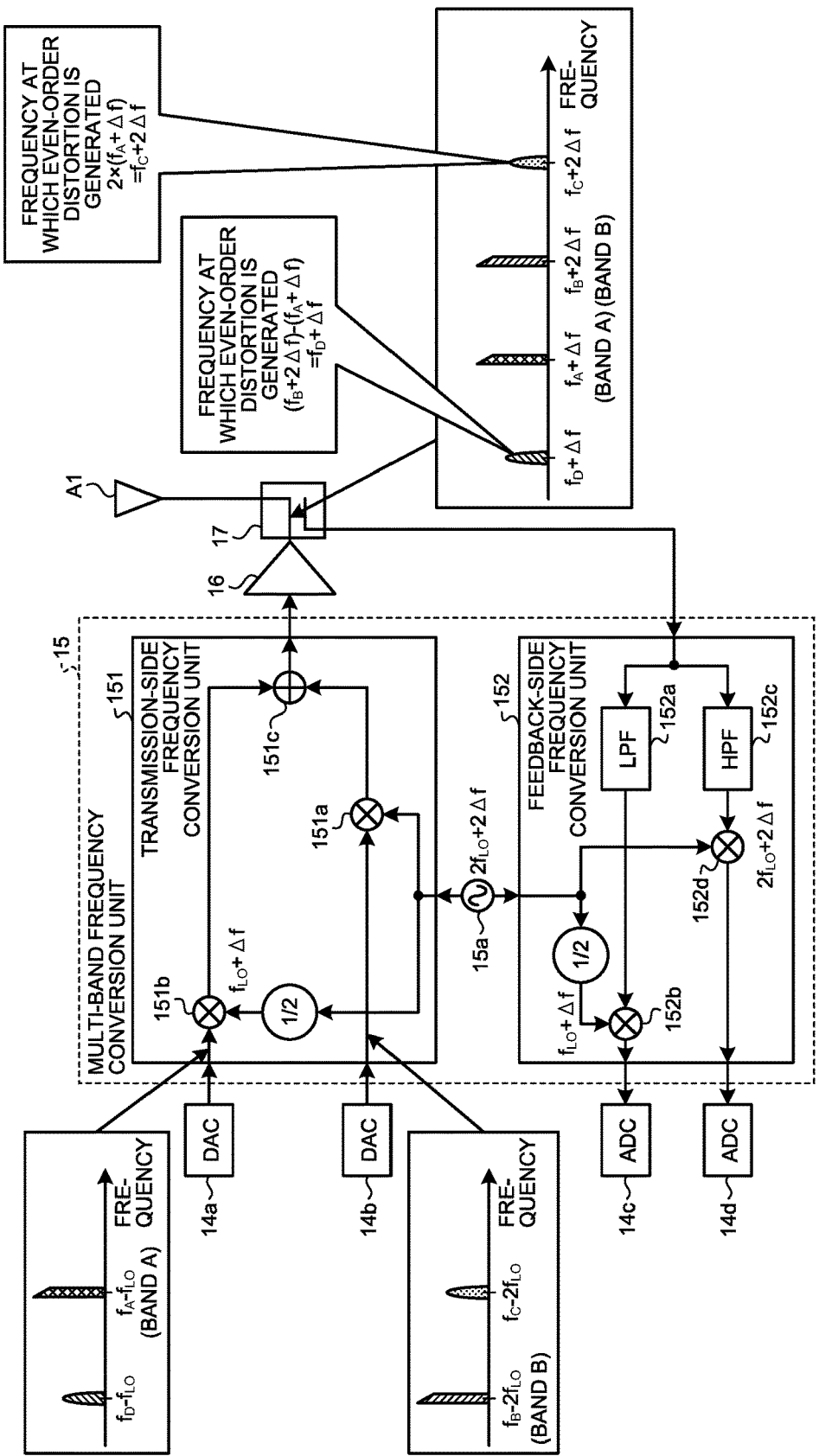
FIG. 2 is a diagram illustrating a configuration of a multi-band frequency conversion unit of a distortion compensation apparatus according to a first embodiment.

FIG. 2 is a diagram illustrating a configuration of the multi-band frequency conversion unit 15 of the distortion compensation apparatus 10 according to the first embodiment. The multi-band frequency conversion unit 15 according to the first embodiment performs frequency conversion with a signal obtained by frequency division (for example, 2 frequency division) of a local signal. As illustrated in FIG. 2, it is assumed that the frequency of the local oscillator source 15a is $2f_{LO}$ and a frequency shift caused by a phase fluctuation is 2 Δf. On a high band side, an up converter 151a performs frequency conversion using a signal with a frequency of $2f_{LO}+2$ Δf. On a low band side, an up converter 151b performs frequency conversion using a signal obtained by 2 frequency division, that is, a signal with a frequency of $f_{LO}+\Delta f$. Therefore, the frequency of the band A is $f_A+\Delta f$ and the frequency of the band B is $f_B+2$ Δf, and the frequencies of the even-order distortion compensation signals are $2f_A+2$ Δf and $f_B-f_A+\Delta f$, respectively. At this time, frequencies at which the even-order distortions are actually generated are $2f_A+2$ Δf and $f_B-f_A+\Delta f$. Therefore, the frequencies at which the even-order distortions are generated and the frequencies of the even-order distortion compensation signals always match each other. Accordingly, influence of a local phase fluctuation is avoided.

Meanwhile, on the feedback side, a feedback signal that is a portion of an output of the amplifier 16 obtained by the coupler 17 is distributed into two signals by a distributor. In an upper path in FIG. 2, that is, a low-band side path, an LPF (Low Pass Filter) 152a allows a low-band side feedback signal, that is, a feedback signal including an odd-order distortion in the band A (the center frequency $f_A+\Delta f$) and an even-order distortion with a center frequency of $f_D+\Delta f=f_B-f_A+\Delta f$ to pass therethrough. Thereafter, a down converter 152b performs frequency conversion for the feedback signal described above by using a signal with the frequency of $f_{LO}+\Delta f$ obtained by 2 frequency division. Consequently, the frequencies become $F_D-f_{LO}$ and $f_A-f_{LO}$. The resultant signal is converted from an analog signal to a digital signal in the common ADC 14c.

Further, in a lower path in FIG. 2, that is, a high-band side path, an HPF (High Pass Filter) 152c allows a high-band side feedback signal, that is, a feedback signal including an odd-order distortion in the band B (the center frequency $f_B+2$ Δf) and an even-order distortion with a center frequency of $f_C+2$ Δf$=2f_A+2$ Δf to pass therethrough. Thereafter, a down converter 152d performs frequency conversion for the feedback signal described above by using a signal with the frequency of $2f_{LO}+2$ Δf. Consequently, the frequencies become $f_B-2f_{LO}$ and $f_C-2f_{LO}$. The resultant signal is converted from an analog signal to a digital signal in the common ADC 14d. As described above, according to the distortion compensation apparatus 10 according to the first embodiment, a relation in which the frequency of a DAC output and the frequency of an ADC input match each other is established, and influence of a frequency shift caused by a phase fluctuation in the local oscillator source 15a is suppressed.

(First Modification)

Figure 3:
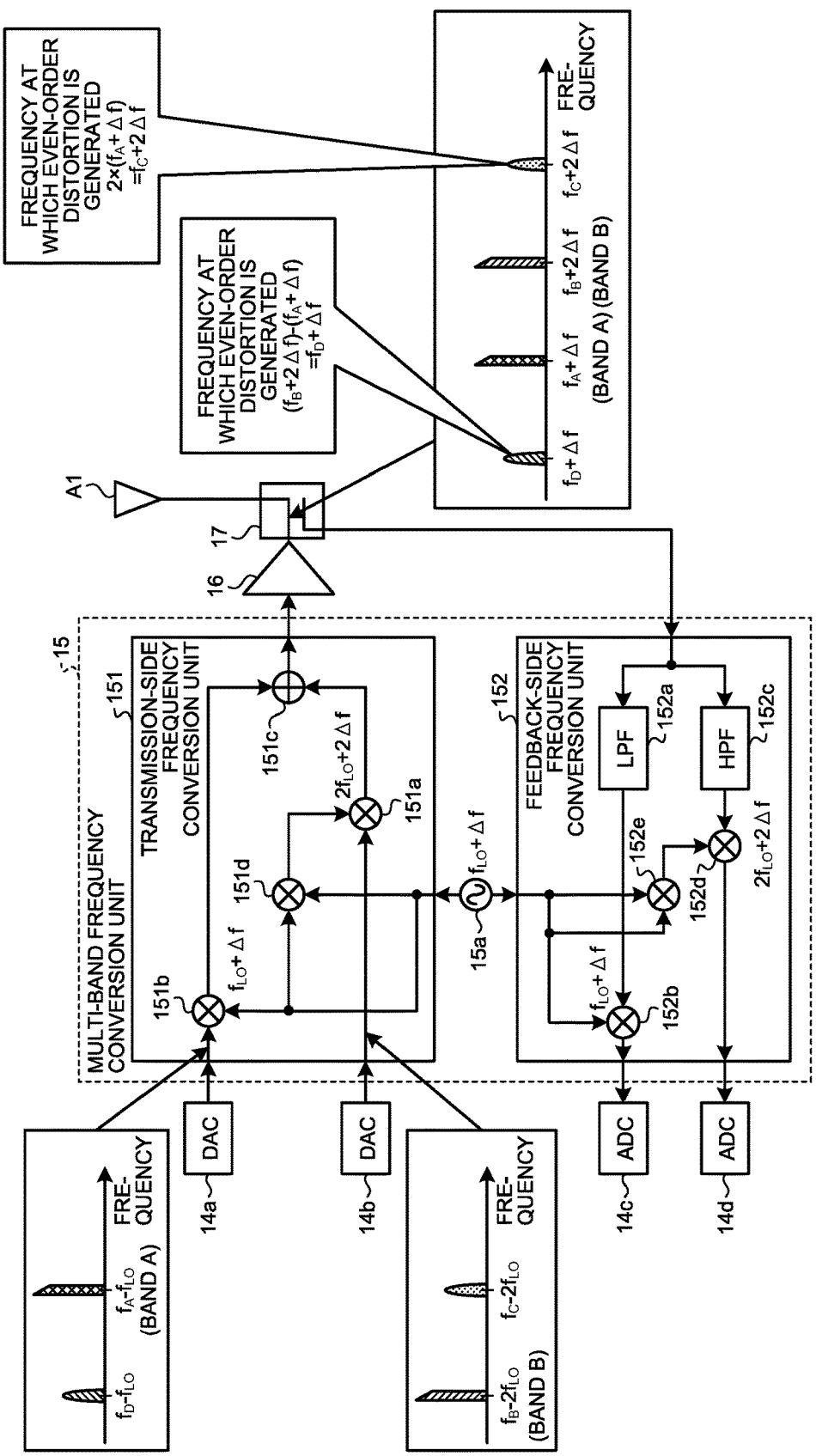
FIG. 3 is a diagram illustrating a configuration of a multi-band frequency conversion unit of a distortion compensation apparatus according to a first modification of the first embodiment.

FIG. 3 is a diagram illustrating a configuration of the multi-band frequency conversion unit 15 of the distortion compensation apparatus 10 according to a first modification of the first embodiment. The distortion compensation apparatus 10 according to the first modification generates a signal with a frequency that is twice the frequency of a local signal of the local oscillator source 15a by multiplying the local signal by 2. In this point, the distortion compensation apparatus 10 according to the first modification is different from the distortion compensation apparatus 10 according to the first embodiment that generates a signal with a half frequency by performing 2 frequency division. That is, the multi-band frequency conversion unit 15 according to the first modification performs frequency conversion with a signal obtained by multiplication of a local signal (for example, multiplication by 2).

It is assumed that the frequency of the local oscillator source 15a is $f_{LO}$ and a frequency shift caused by a phase fluctuation is $\Delta f$. On a low band side, the up converter 151b performs frequency conversion using a signal with the frequency of $f_{LO}+\Delta f$. On a high band side, the up converter 151a performs frequency conversion using a signal with the frequency of $2f_{LO}+2\Delta f$ obtained by multiplication by 2 by a mixer 151d. Therefore, the frequency of the band A becomes $f_A+\Delta f$, the frequency of the band B becomes $f_B+2\Delta f$, and the frequencies of even-order distortion compensation signals become $2f_A+2\Delta f$ and $f_B-f_A+\Delta f$, respectively. At this time, frequencies at which the even-order distortions are actually generated are $2f_A+2\Delta f$ and $f_B-f_A+\Delta f$. Therefore, the frequencies at which the even-order distortions are generated and the frequencies of the even-order distortion compensation signals always match each other. Accordingly, influence of a local phase fluctuation is avoided.

As described above, the distortion compensation apparatus 10 is an apparatus that compensates a nonlinear distortion of a power amplifier that amplifies a transmission signal (for example, a multi-band signal), and includes the local oscillator source 15a, the transmission-side frequency conversion unit 151, and the even-order distortion compensation unit 12. The local oscillator source 15a generates a local signal that is common to a transmission side and a feedback side. The transmission-side frequency conversion unit 151 performs frequency conversion with a signal generated by using an output signal of the local oscillator source 15a, in such a manner that the frequency of a DAC output and the frequency of an ADC input match each other and a frequency at which an even-order distortion is generated and a frequency of an even-order distortion compensation signal always match each other. The even-order distortion compensation unit 12 compensates an even-order distortion generated in a power-amplifier output signal (a signal obtained by amplifying a transmission signal) by using the even-order distortion compensation signal obtained by frequency conversion by the transmission-side frequency conversion unit 151. In other words, the local oscillator source 15a generates a first signal that is used on the transmission side and the feedback side in common. The transmission-side frequency conversion unit 151 uses a second signal based on the first signal described above for converting a frequency of a third signal that is the even-order distortion compensation signal. The even-order distortion compensation unit 12 compensates an even-order distortion in the transmission signal caused by amplification by using a signal obtained by frequency converting the third signal described above by the transmission-side frequency conversion unit 151.

Specifically, in the distortion compensation apparatus 10, the transmission-side frequency conversion unit 151 includes the up converter 151a and the up converter 151b. The up converter 151a performs frequency conversion for a first-band (high-band) side signal with the first signal generated by using the output signal of the local oscillator source 15a. The up converter 151b performs frequency conversion for a second-band (low-band) side signal with the second signal generated by using the output signal of the local oscillator source 15a. In this case, the even-order distortion compensation signal generated by the even-order distortion compensation unit 12 is subjected to frequency conversion by the up converter 151a and compensates the even-order distortion generated on the first band side of the signal obtained by amplifying the transmission signal. Also, the even-order distortion compensation signal generated by the even-order distortion compensation unit 12 is subjected to frequency conversion by the up converter 151b and compensates the even-order distortion generated on the second band side of the signal obtained by amplifying the transmission signal.

Further, in the distortion compensation apparatus 10, the local oscillator source 15a may generate a signal with a plurality of frequencies by frequency division or multiplication.

As described above, the distortion compensation apparatus 10 performs frequency conversion by the multi-band frequency conversion unit 15 to establish a condition where a frequency at which an even-order distortion is actually generated and the frequency of the even-order distortion compensation signal described above match each other (for example, $2\Delta f_1 = \Delta f_2$). That is, the distortion compensation apparatus 10 avoids influence of a local phase fluctuation by the multi-band frequency conversion unit 15 including one local oscillator source 15a that is common to the transmission side and the feedback side. Therefore, the distortion compensation apparatus 10 can improve distortion compensation performance in common amplification of multiple bands. That is, the distortion compensation apparatus 10 can improve distortion compensation performance for an even-order distortion in addition to distortion compensation performance for an odd-order distortion. Accordingly, an even-order residual distortion does not move up and down over time, and the distortion compensation apparatus 10 can keep a state where a residual distortion is the smallest.

Second Embodiment

Figure 4:
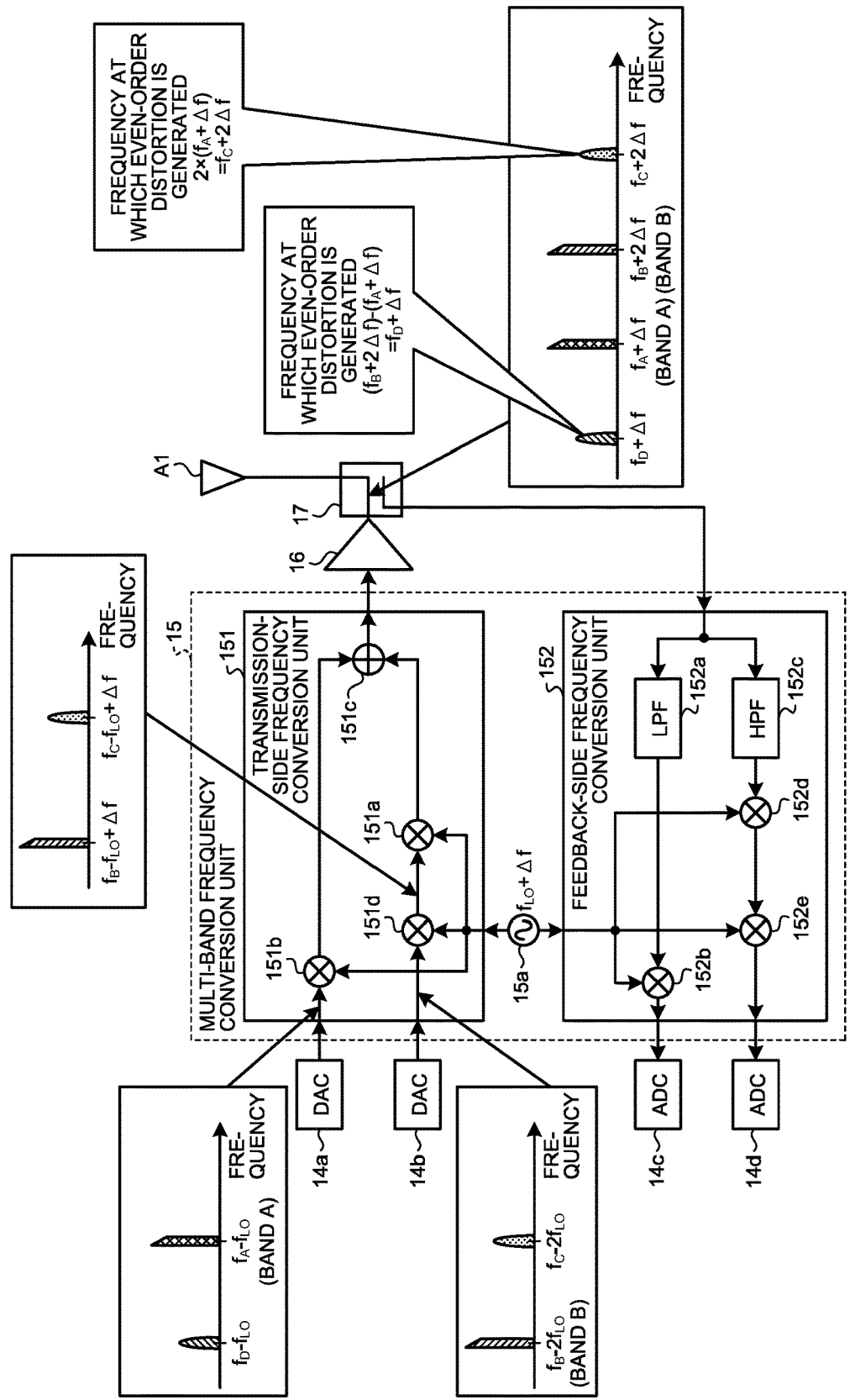
FIG. 4 is a diagram illustrating a configuration of a multi-band frequency conversion unit of a distortion compensation apparatus according to a second embodiment.

Next, a second embodiment is described. A configuration of a distortion compensation apparatus according to the second embodiment is identical to the configuration of the distortion compensation apparatus 10 according to the first embodiment illustrated in FIG. 1 in a main portion. Therefore, common constituent elements are denoted by like reference signs and illustrations and detailed descriptions thereof will be omitted. FIG. 4 is a diagram illustrating a configuration of the multi-band frequency conversion unit 15 of the distortion compensation apparatus 10 according to the second embodiment. With reference to FIG. 4, the multi-band frequency conversion unit 15 according to the second embodiment is described below while mainly describing the differences between the first embodiment and the second embodiment.

As illustrated in FIG. 4, the multi-band frequency conversion unit 15 performs frequency conversion m times (for example, once) on a low band side and n times (m<n, for example, twice) on a high band side. As the local oscillator source 15a of the frequency conversion, a common source is used at all times.

It is assumed that the frequency of the local oscillator source 15a is $f_{LO}$ and a frequency shift caused by a phase fluctuation is $\Delta f$. On the low band side, the up converter 151b performs frequency conversion once using a signal with the frequency of $f_{LO}+\Delta f$. On the high band side, the up converter 151a performs frequency conversion twice using the signal with the frequency of $f_{LO}+\Delta f$. Therefore, the frequency of the band A is $f_A+\Delta f$ and the frequency of the band B is $f_B+2\Delta f$, and the frequencies of even-order distortion compensation signals are $2f_A+2\Delta f$ and $f_B-f_A+\Delta f$, respectively. At this time, frequencies at which the even-order distortions are actually generated are $2f_A+2\Delta f$ and $f_B-f_A+\Delta f$, respectively. Therefore, the frequencies at which the even-order distortions are generated and the frequencies of the even-order distortion compensation signals always match each other. Accordingly, influence of a local phase fluctuation is avoided.

(Second Modification)

Figure 5:
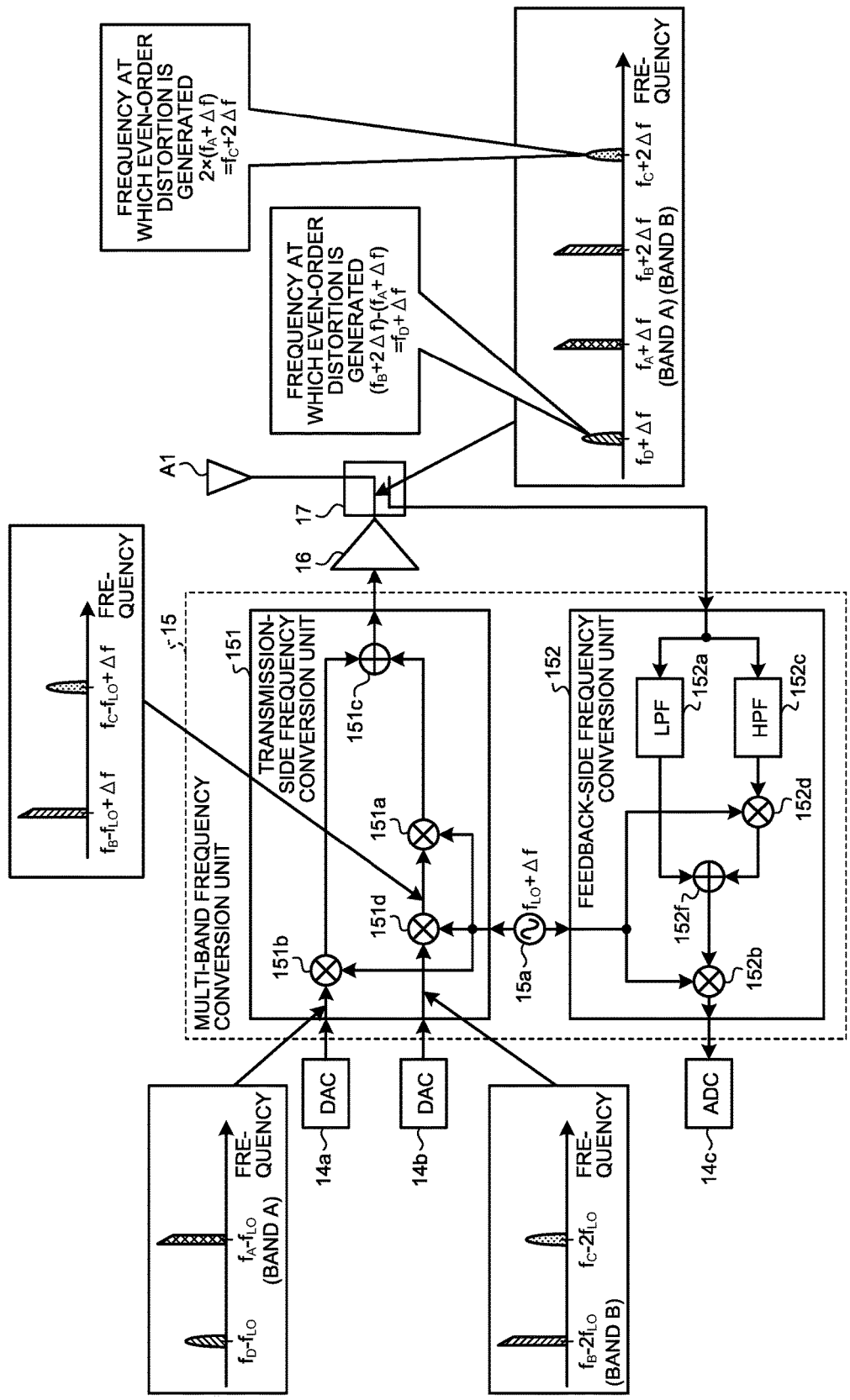
FIG. 5 is a diagram illustrating a configuration of a multi-band frequency conversion unit of a distortion compensation apparatus according to a second modification of the second embodiment.

FIG. 5 is a diagram illustrating a configuration of the multi-band frequency conversion unit 15 of the distortion compensation apparatus 10 according to a second modification of the second embodiment. As illustrated in FIG. 5, the distortion compensation apparatus 10 according to the second modification combines a low-band side portion of a feedback signal from the coupler 17, which is made to pass through the LPF 152a, and a high-band side portion of the feedback signal, which is made to pass through the HPF 152c and is subjected to frequency conversion once, with each other by a signal combiner 152f. The down converter 152b is a down converter common to the low band side and the high band side, and performs frequency conversion for the signal after signal combination described above and outputs the resultant signal to the common ADC 14c.

More specifically, on a feedback side, a feedback signal that is a portion of an output of the amplifier 16 obtained by the coupler 17 is distributed into two signals by a distributor. In an upper path in FIG. 5, that is, a low-band side path, the LPF 152a allows a low-band side feedback signal, that is, a feedback signal including an odd-order distortion in the band A (the center frequency $f_A+\Delta f$) and an even-order distortion with the center frequency of $f_D+\Delta f=f_B-f_A+\Delta f$ to pass therethrough. Meanwhile, in a lower path in FIG. 5, that is, a high-band side path, the HPF 152c allows a high-band side feedback signal, that is, a feedback signal including an odd-order distortion in the band B (the center frequency $f_B+2\ \Delta f$) and an even-order distortion with the center frequency of $f_C+2\ \Delta f=2f_A+2\ \Delta f$ to pass therethrough. Thereafter, the down converter 152d converts the respective frequencies to $f_B-f_{LO}+\Delta f$ and $f_C-f_{LO}+\Delta f$ by using a signal with the frequency of $f_{LO}+\Delta f$. The signal combiner 152f combines a signal after the frequency conversion with an output signal from the LPF 152a. A signal obtained by signal combination is further subjected to frequency conversion by the down converter 152b that is common to the low-band side and the high-band side by using a signal with the frequency of $f_{LO}+\Delta f$ to obtain frequencies of $f_D-f_{LO}$, $f_A-f_{LO}$, $f_B-2f_{LO}$, and $f_C-2f_{LO}$, respectively. Thereafter, a signal after frequency conversion is converted from an analog signal to a digital signal by the common ADC 14c.

As described above, according to the distortion compensation apparatus 10 according to the second modification, the feedback-side frequency conversion unit 152 combines a low-band side portion of a feedback signal, which is made to pass through a filter, and a high-band side portion of the feedback signal, which is made to pass through a filter and is then subjected to frequency conversion, with each other and further performs frequency conversion for a signal obtained by the signal combination. Therefore, the distortion compensation apparatus 10 according to the second modification can simply configure a circuit of the multi-band frequency conversion unit 15 by making a portion of the feedback side common.

Third Embodiment

Figure 6:
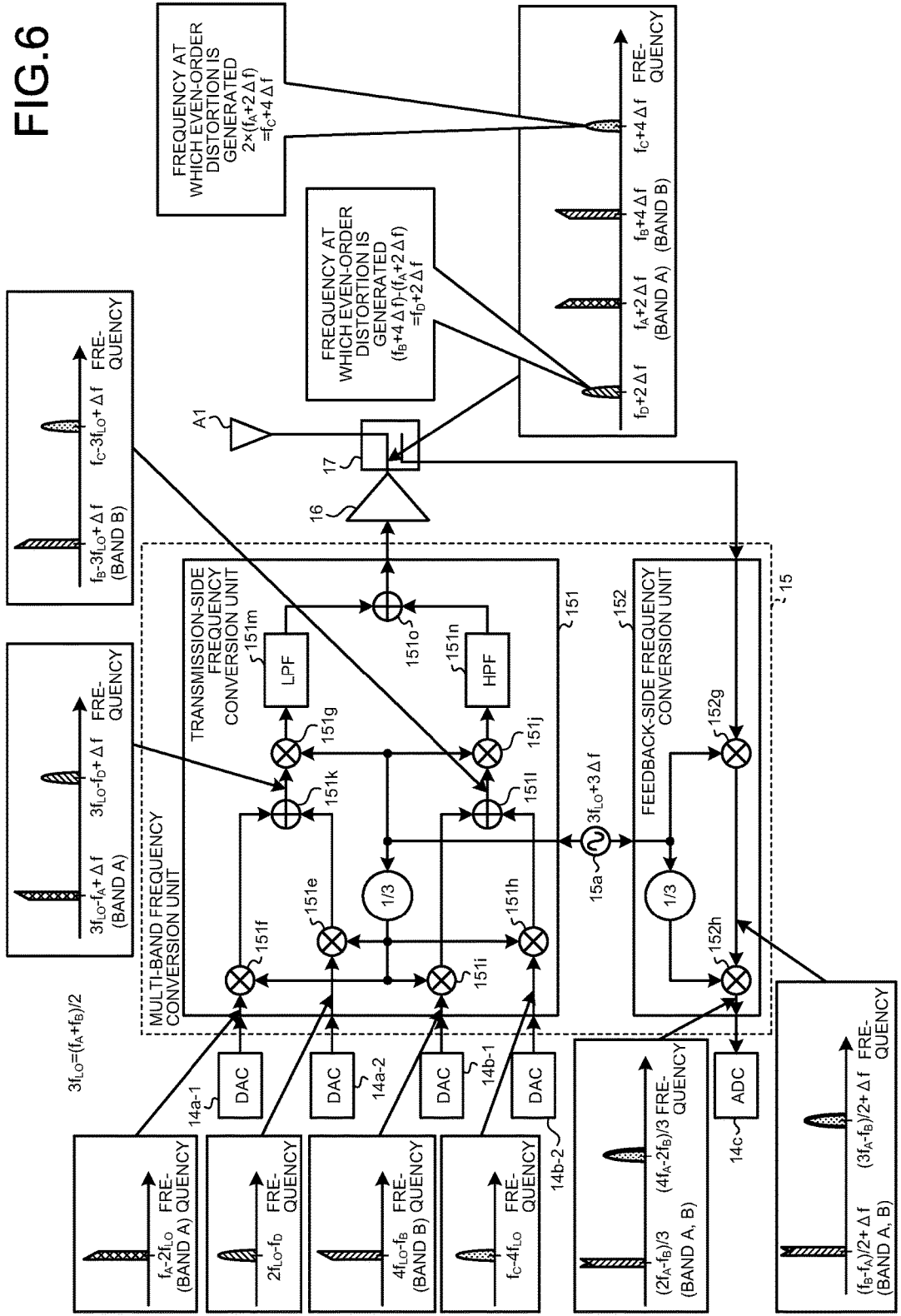
FIG. 6 is a diagram illustrating a configuration of a multi-band frequency conversion unit of a distortion compensation apparatus according to a third embodiment.
Figure 7:
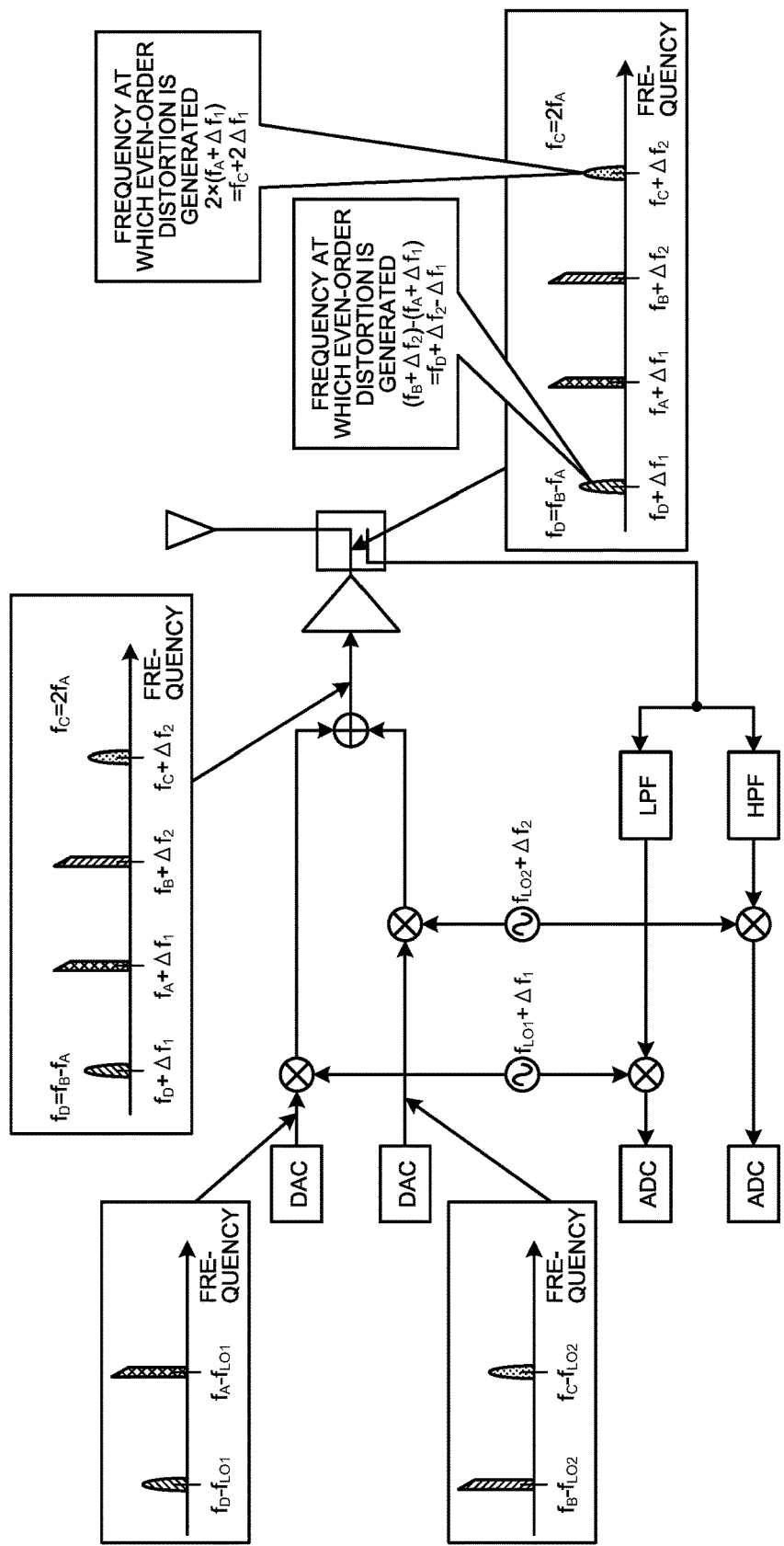
FIG. 7 is an explanatory diagram of problems of a related distortion compensation apparatus.

Next, a third embodiment is described. A configuration of a distortion compensation apparatus according to the third embodiment is identical to the configuration of the distortion compensation apparatus 10 according to the first embodiment illustrated in FIG. 1 in a main portion thereof. Therefore, common constituent elements are denoted by like reference signs and illustrations and detailed descriptions thereof will be omitted. FIG. 6 is a diagram illustrating the configuration of the multi-band frequency conversion unit 15 of the distortion compensation apparatus 10 according to the third embodiment. With reference to FIG. 6, the multi-band frequency conversion unit 15 according to the third embodiment is described below while mainly describing the differences between the first embodiment and the third embodiment.

The distortion compensation apparatus 10 according to the third embodiment superimposes odd-order distortions on each other and even-order distortions on each other, and performs common feedback. Specifically, the distortion compensation apparatus 10 feeds back a signal that includes a frequency component for which a plurality of odd-order distortions are superimposed and a frequency component for which a plurality of even-order distortions are superimposed, as a common feedback signal by the feedback-side frequency conversion unit 152. The even-order distortion compensation unit 12 separates the superimposed odd-order distortions and the superimposed even-order distortions from each other by using the common feedback signal described above, and compensates an even-order distortion generated in a transmission signal.

As illustrated in FIG. 6, assuming that the frequency of the local oscillator source 15a is $3f_{LO}$ and a frequency shift caused by a phase fluctuation is 3 $\Delta f$, a frequency of a signal obtained by 3 frequency division is $f_{LO}+\Delta f$. When the frequency of a local signal satisfies $3f_{LO}=(f_A+f_B)/2$, a dual-band signal in the band A (a center frequency $f_A+2\ \Delta f$) and the band B (a center frequency $f_B+4\ \Delta f$) is subjected to frequency conversion by a first down converter 152g on a feedback side by using a signal with a frequency of $3f_{LO}+3\ \Delta f=(f_A+f_B)/2+3\ \Delta f$ to have the same frequency of $(f_B-f_A)/2+\Delta f$. Meanwhile, even-order distortions with a center frequency of $2f_A+4\ \Delta f=f_C+4\ \Delta f$ and a center frequency of $f_B-f_A+2\ \Delta f=f_D+2\ \Delta f$ are subjected to frequency conversion by the first down converter 152g on the feedback side by using the signal with the frequency of $3f_{LO}+3\ \Delta f=(f_A+f_B)/2+3\ \Delta f$ to have the same frequency of $(3f_A-f_B)/2+\Delta f$. These signals obtained by the frequency conversion are further subjected to frequency conversion by a second down converter 152h on the feedback side by using a signal with a frequency of $f_{LO}+\Delta f=(f_A+f_B)/6+\Delta f$ obtained by 3 frequency division to have a frequency of $(2f_A-f_B)/3$ and a frequency of $(4f_A-2f_B)/3$, respectively.

Meanwhile, on a transmission side, an odd-order distortion compensation signal with a frequency of $f_A-2f_{LO}=(2f_A-f_B)/3$ and an even-order distortion compensation signal with a frequency of $2f_{LO}-f_D=(4f_A-2f_B)/3$ are output from different DACs 14a-1 and 14a-2, respectively. The output signals are subjected to frequency conversion by up converters 151f and 151e that use a signal with the frequency of $f_{LO}+\Delta f$ obtained by 3 frequency division, to have a frequency of $3f_{LO}-f_A+\Delta f=(f_B-f_A)/2+\Delta f$ and a frequency of $3f_{LO}-f_D+\Delta f=(3f_A-f_B)/2+\Delta f$, respectively, and are then combined with each other by a signal combiner 151k. Also, an odd-order distortion compensation signal with a frequency of $4f_{LO}-f_B=(2f_A-f_B)/3$ and an even-order distortion compensation signal with a frequency of $f_C-4f_{LO}=(4f_A-2f_B)/3$ are output from different DACs 14b-1 and 14b-2, respectively. The output signals are subjected to frequency conversions by up converters 151i and 151h that use the signal with the frequency of $f_{LO}+\Delta f$ obtained by 3 frequency division, to have a frequency of $f_B-3f_{LO}+\Delta f=(f_B-f_A)/2+\Delta f$ and a frequency of $f_C-3f_{LO}+\Delta f=(3f_A-f_B)/2+\Delta f$, respectively, and are then combined with each other by a signal combiner 151l.

In an upper path in FIG. 6, that is, a low-band side path, a signal obtained by signal combination described above is subjected to frequency conversion by an up converter 151g that uses the signal with the frequency of $3f_{LO}+3\Delta f$ to have frequencies of $f_A+2\ \Delta f$, $f_D+2\ \Delta f=f_B-f_A+2\ \Delta f$, $f_B+4\ \Delta f$, and $f_C+4\ \Delta f=2f_A+4\ \Delta f$. An LPF 151m allows only a low-band side portion of a signal obtained by the corresponding frequency conversion, that is, a signal with frequencies of $f_A+2\ \Delta f$ and $f_D+2\ \Delta f=f_B-f_A+2\ \Delta f$ to pass therethrough. Meanwhile, in a lower path in FIG. 6, that is, a high-band side path, a signal obtained by the signal combination described above is subjected to frequency conversion by an up converter 151j that uses the signal with the frequency of $3f_{LO}+3\ \Delta f$ to have frequencies of $f_A+2\ \Delta f$, $f_D+2\ \Delta f=f_B-f_A+2\ \Delta f$, $f_B+4\ \Delta f$, and $f_C+4\ \Delta f=2f_A+4\ \Delta f$. An HPF 151n allows only a high-band side portion of a signal obtained by the corresponding frequency conversion, that is, a signal with frequencies of $f_B+4\ \Delta f$ and $f_C+4\ \Delta f=2f_A+4\ \Delta f$ to pass therethrough.

An output signal from the LPF 151m and an output signal from the HPF 151n are combined with each other by a signal combiner 151o and the resultant signal is input to the amplifier 16. At this time, frequencies at which even-order distortions are actually generated in an amplifier output are $2f_A+4\ \Delta f$ and $f_B-f_A+2\ \Delta f$, respectively. Therefore, the frequencies at which the even-order distortions are generated and the frequencies of the even-order distortion compensation signals always match each other. Accordingly, influence of a local phase fluctuation is avoided.

In the embodiments and the modifications described above, a mode has been described as an example, in which a local oscillator source for generating a local signal common to a transmission side and a feedback side is one, that is, the local oscillator source 15a in the distortion compensation apparatus 10. However, the number of the local oscillator sources may be two or more.

Further, in the embodiments and the modifications described above, two bands (for example, 4.6 GHz and 9.0 GHz) are described as an example of frequency bands used for signal transmission. However, a base station or the like including the distortion compensation apparatus 10 may transmit a signal by using one band or three or more bands. Similarly, the number of bands in each of which an even-order distortion is suppressed is not limited to two, but may be one or three or more. Further, a frequency band at which an odd-order distortion is generated and a frequency band at which an even-order distortion is generated are not always different from each other.

Furthermore, the distortion compensation apparatuses 10 according to the embodiments and the modifications described above each use the same local oscillator source 15a on a transmission side and a reception side. However, different local oscillator sources may be used. Although the distortion compensation apparatus 10 performs frequency conversion for the first-band (high-band) side signal on the transmission side and the reception side by using the same frequency (the first signal described above), it may perform frequency conversion by using different frequencies. As for the second-band (low-band) side signal, the distortion compensation apparatus 10 may also perform frequency conversion by using different frequencies.

Respective constituent elements of the distortion compensation apparatus 10 need not be physically identical to the configurations illustrated in the drawings. That is, the specific mode of distribution and integration of the respective devices is not limited to the illustrated ones, and all or a part thereof can be functionally or physically distributed or integrated in an arbitrary unit, according to various kinds of load and the status of use. For example, the transmission-side frequency conversion unit 151 and the feedback-side frequency conversion unit 152 may be integrated as one constituent element. To the contrary, the transmission-side frequency conversion unit 151 may be distributed into a portion that converts frequencies on the low band (band A) side ($f_D-f_{LO}$ and $f_A-f_{LO}$) and a portion that converts frequencies on the high band (band B) side ($f_B-2f_{LO}$ and $f_C-2f_{LO}$). Further, a memory that stores therein a two-dimensional LUT and the like may be connected via a cable of a network as an external device of the distortion compensation apparatus 10.

In the above descriptions, respective configurations and operations have been described for each of the embodiments and modifications. However, the distortion compensation apparatus according to the respective embodiments and modifications can also include constituent elements specific to other embodiments and modifications in combination. Further, an arbitrary mode can be employed for the combination of the embodiments and modifications. For example, the combination is not limited to two but may be three or more. For example, the method of frequency multiplication according to the first modification can be applied to the distortion compensation apparatus 10 according to the second and third embodiments. Alternatively, the circuit configuration on the feedback side according to the second modification can be applied to the distortion compensation apparatus 10 according to the first and third embodiments. Further, one distortion compensation apparatus 10 can include all of the constituent elements described in the first to third embodiments and the first and second modifications in combination.

According to one aspect of the distortion compensation apparatus disclosed in the present application, it is possible to improve distortion compensation performance thereof.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A distortion compensation apparatus comprising:
a generation unit that generates a first signal to be used on a transmission side and a feedback side in common;
a conversion unit that converts a frequency of a third signal that is to be an even-order distortion compensation signal by using a second signal that is based on the first signal; and
a compensation unit that compensates an even-order distortion in a transmission signal caused by amplification by using a signal obtained by frequency conversion for the third signal by the conversion unit;
wherein the conversion unit performs frequency conversion for a low-band side portion of the transmission signal m times, and performs frequency conversion for a high-band side portion of the transmission signal n (m<n) times.

2. The distortion compensation apparatus according to claim 1, wherein the generation unit generates signals with a plurality of frequencies by frequency division or frequency multiplication.

3. The distortion compensation apparatus according to claim 1, wherein the conversion unit combines a low-band side portion and a high-band side portion of a feedback signal, each of which is made to pass through a filter, with each other and further performs frequency conversion for a signal obtained by the combination.

4. The distortion compensation apparatus according to claim 1, wherein
the conversion unit feeds back a signal including a frequency component for which a plurality of odd-order distortions are superimposed on each other and a frequency component for which, a plurality of even-order distortions are superimposed on each other, as a common feedback signal, and
the compensation unit separates the plurality of superimposed odd-order distortions and the plurality of superimposed even-order distortions from each other by using the common feedback signal, and compensates an even-order distortion generated in the transmission signal.

5. A distortion compensation method comprising:
generating a first, signal to be used on a transmission side and a feedback side in common;
converting a frequency of a third signal that is to be an even-order distortion compensation signal by using a second signal that is based on the first signal;
compensating an even-order distortion in a transmission signal caused by amplification by using a signal obtained by frequency conversion for the third signal; and
performing frequency conversion for a low-band side portion of the transmission signal m times, and performing frequency conversion for a high-band side portion of the transmission signal n (m<n) times.

* * * * *